United States Patent [19]

Stamey, Jr. et al.

[11] Patent Number: 5,733,443
[45] Date of Patent: Mar. 31, 1998

[54] INSIDE TO OUTSIDE FLOW FILTERS

[75] Inventors: Willie Luther Stamey, Jr., Kings Mountain; Mark Allen Roll, Bessemer City; Christopher Louis Loafman, Gastonia, all of N.C.

[73] Assignee: Dana Corporation, Toledo, Ohio

[21] Appl. No.: 681,989

[22] Filed: Jul. 30, 1996

[51] Int. Cl.⁶ ............................................. B01D 35/147
[52] U.S. Cl. ..................... 210/131; 210/136; 210/438; 210/440; 210/453; 210/458; 210/493.2
[58] Field of Search .................................. 210/130, 131, 210/136, 437, 438, 439, 440, 443, 444, 458, DIG. 17, 453, 493.2

[56] References Cited

U.S. PATENT DOCUMENTS

| | | | |
|---|---|---|---|
| 2,886,180 | 5/1959 | Morgan et al. | 210/438 |
| 3,370,708 | 2/1968 | Hultgren et al. | 210/136 |
| 3,502,218 | 3/1970 | Tuffnell et al. | 210/305 |
| 3,508,658 | 4/1970 | McVay | 210/443 |
| 3,724,665 | 4/1973 | Hall | 210/130 |
| 4,292,179 | 9/1981 | Stone et al. | 210/443 |
| 5,489,384 | 2/1996 | Janik et al. | 210/438 |

*Primary Examiner*—Matthew O. Savage
*Attorney, Agent, or Firm*—Millen, White, Zelane, & Branigan, P.C.

[57] ABSTRACT

Flow inverter arrangements are provided for utilization in spin-on, liquid filter cartridges, such as lubricating oil filter cartridges and the like, wherein the filter cartridge structure normally used for "inside-out" flow is reversed to accommodate "outside-in" flow. Each embodiment of the invention utilizes a cylindrical wall disposed within the hollow core of a filter media, in spaced relation thereto, so as to define an annular space which is aligned with the input ports in the end plate of the housing. A filter media has a first end cap within an opening aligned with the central core so that liquid which is passed from the annular space and through the filter media can pass through the opening in the end cap and to the central port which is aligned with the hollow core of the filter media, but isolated from the filter media by the interior wall. The entire filter element is shifted axially against the bias of the coil spring when the filter media becomes clogged so that the filter media can be bypassed. In one embodiment, an anti-drainback valve is provided at the central opening through the first end cap to prevent liquid in the filter cartridge from completely draining therefrom when it is not pressurized by, for example, operation of a pump such as the lubricating oil pump of an internal combustion engine.

12 Claims, 3 Drawing Sheets

INSIDE TO OUTSIDE FLOW FILTERS

FIELD OF THE INVENTION

The present invention is directed to inside to outside flow filters. More particularly, the present invention is directed to inside to outside flow filters for liquids each as lubricants.

BACKGROUND OF THE INVENTION

For some automotive applications, flow-through oil filter cartridges have been changed so that inlet oil now flows through radially positioned, spaced inlet ports in the filter cartridge through the inside surface of an annular filter media and out through a centrally disposed, outlet port. The centrally disposed, outlet port is threaded so that these filter cartridge configurations are in many essential ways similar to standard spin-on filter cartridges.

In most prior art spin-on filter cartridges, lubricating oil or another liquid to be filtered flows into radially disposed, spaced apart ports, through a filter media from the outside and exits the filter cartridge through a central port. Production lines have been operating for many years producing these type of spin-on filters.

To the extent that these production facilities can continue to be used with as little disruption as possible, the expense of accommodating the new arrangement in which flow the fluid to be filtered is reversed is minimized. One way to minimize expense is to use as many conventional components as possible so as to avoid the delay and expense of redesigning components, retooling production machinery and retraining employees. In reconfiguring filter cartridges, it is also preferable to reduce the number of component parts and reduce line labor required for assembly. In this regard, it is desirable to allow an inner element to function as a bypass valve, the opening pressure of which is controlled by the same spring pressure which seats the filter element within the cartridge. Wherever possible, using a single element to perform more than one function reduces expense and labor as well as simplifies valve operation, all of which reduce cost and help expedite the introduction and sale of new and improved filters which accommodate inside/out liquid flow.

SUMMARY OF THE INVENTION

It is a feature of the present invention to provide new and improved arrangements for reversing flow in filters, such as spin-on filters, wherein the flow reversal is accomplished effectively and at minimal expense.

In accordance with the present invention, flow reversal from outside-in to inside-out in spin-on type filter cartridges is accomplished by capturing inlet fluid from a plurality of radially disposed inlet ports, directing the fluid in through the inside surface of a filter media and then out through the outside surface of the media before discharging the fluid through a central port. This is accomplished by a filter element adapted for use in a spin-on filter cartridge, wherein the spin-on filter cartridge has a central axis and includes a housing having at one end a plate with a central port and radially positioned ports spaced from the central port. A coil spring is disposed between the housing and filter element to urge the filter element toward the end plate. The filter element includes an annular filter media defining a hollow core and first and second ends. A first end cap is disposed at the first end of the filter media. The first end cap has a central opening therein aligned with the hollow core of the filter media and is abutted by the coil spring. A second end cap is disposed at the second end of the filter media. The second end cap is adapted to fit around both the central port and radially positioned ports of the end plate in axial spaced relation thereto. A cylindrical wall is disposed within the hollow core in radially spaced relation to the filter media and defines an annular inlet space between the filter media and wall space within the hollow core. An opening proximate the second end of the filter media allows the liquid to be filtered to flow into the annular space. When the liquid is under pressure, the liquid passes radially through the filter media into the open area between the filter media and the housing and thereafter flows through the opening in the first end plate into the central space defined by the inner wall for discharge through the central port.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
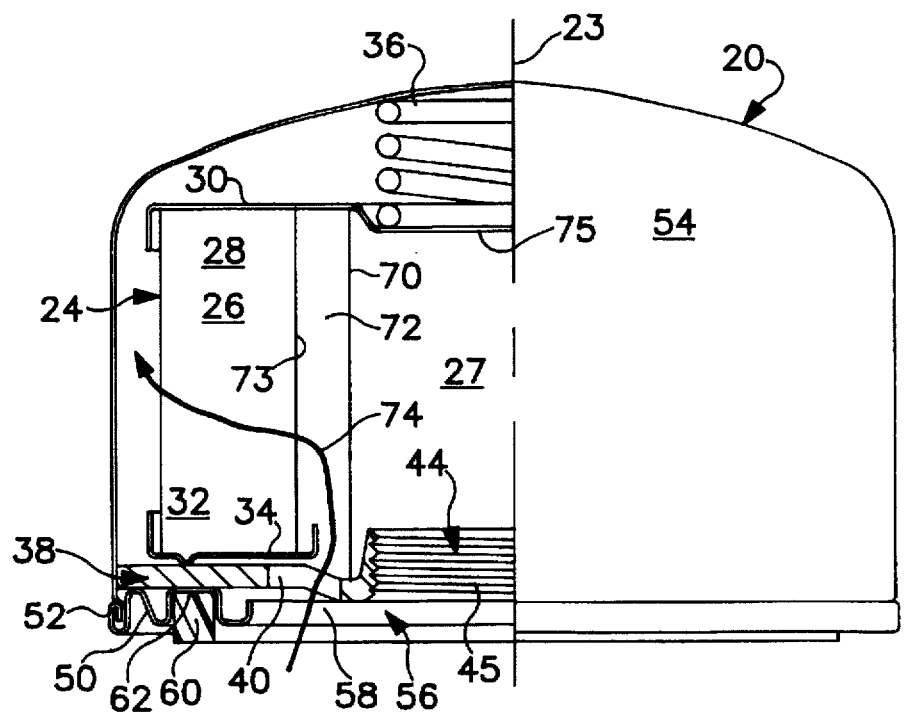
FIG. 1 is a side view, partially in elevation, illustrating a first embodiment of a filter cartridge configured in accordance with the principles of the present invention and showing lubricating oil entering the filter cartridge.

Referring now generally to the invention illustrated in FIGS. 1–6, there is shown a filter cartridge assembly formed about a central longitudinal axis 23. The filter cartridge 20 includes a filter element 24 having therein a filter media 26. The filter media 26 is preferably configured of pleated filter paper. The filter media 26 has a hollow core 27 and is closed at a top end 28 by a first end cap 30 and at a bottom end 32 by a second end cap 34. A coil spring 36 urges the filter element 24 toward an end plate 38 having a plurality of radially disposed, spaced apart, ports 40 and a center opening port 44 having an internal helical thread 45 which is coaxial with the axis 23 and is aligned with the hollow core 27 of the filter element 24.

The end plate 38 is welded to a sheet metal cover 50. The cover 50 is crimped by a peripheral crimp 52 to a housing 54 which encloses the components of the filter cartridge 20 and against which the coil spring 36 bears. The cover 50 includes a central opening 56 which is defined by a lip 58. The opening 56 is aligned with both the radially disposed ports 40 and the central port 44. Proximate the opening 56 is an annular seal 60 of a deformable material. The annular seal 60 is seated within an annular groove 62 defined in the cover 50. When the cartridge 20 is mounted on an engine (not shown), an externally threaded standpipe (not shown) is threadably received in the opening 44 and retained by the threads 45 as the filter assembly 20 are known as "spin-on filters." As the filter cartridge assembly 20 is rotated. Thus, filter cartridge assemblies such as the filter cartridge assembly 20 is tightened against the engine, the gasket 60 deforms to provide an outer seal. The structures described thus far are substantially repeated in each embodiment of this invention, there being further modification of the filter element 24 with the filter media 26 changing axial dimension but otherwise remaining substantially the same.

Figure 2:
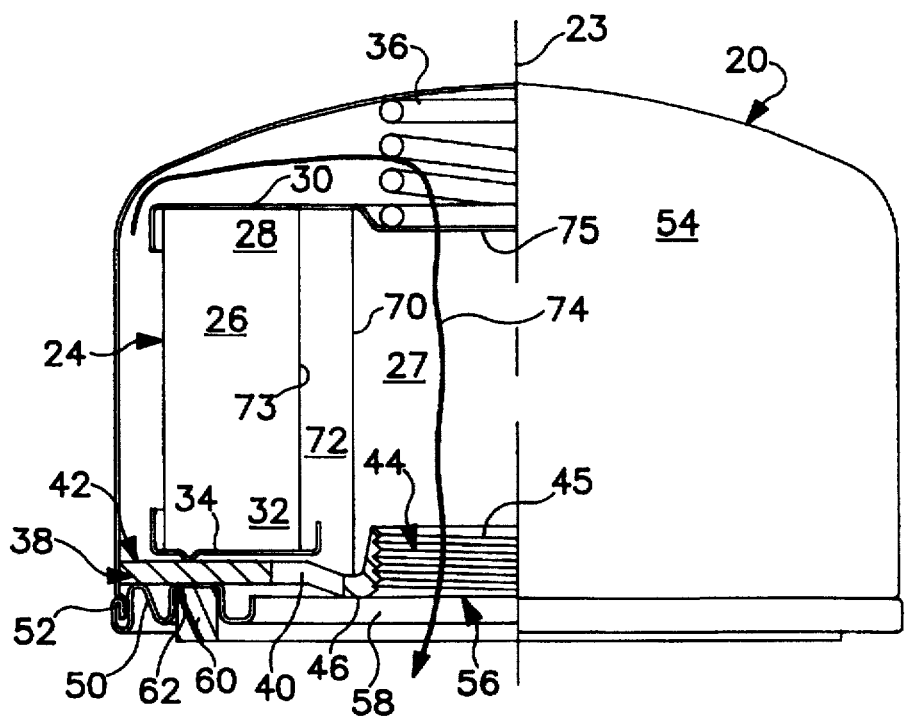
FIG. 2 is a view similar to FIG. 1, but showing lubricating oil leaving the cartridge.

A first embodiment of the invention is shown in FIGS. 1 and 2. In FIGS. 1 and 2, an inner cylindrical fluid impervious wall 70 is disposed between the filter media 26 and the hollow core 27 and an annular space 70 is disposed between the inner surface 73 of the filter media 26. The annular space 72 is aligned with the radially disposed ports 40 so that unfiltered oil following the path of arrows 74 enters the annular space 72. The unfiltered oil then flows through the filter media 26 and enters the hollow core 27 through an opening 75 in the annular first end cap 30 which closes the top of the filter media 26 and communicates with hollow core. The bottom end cap 34 rests directly on the end plate 38 and is urged thereagainst by the coil spring 36. In this embodiment, flow reversal is accomplished by utilizing the cylindrical wall 70 and providing an opening 75 in the end cap 30.

Figure 3:
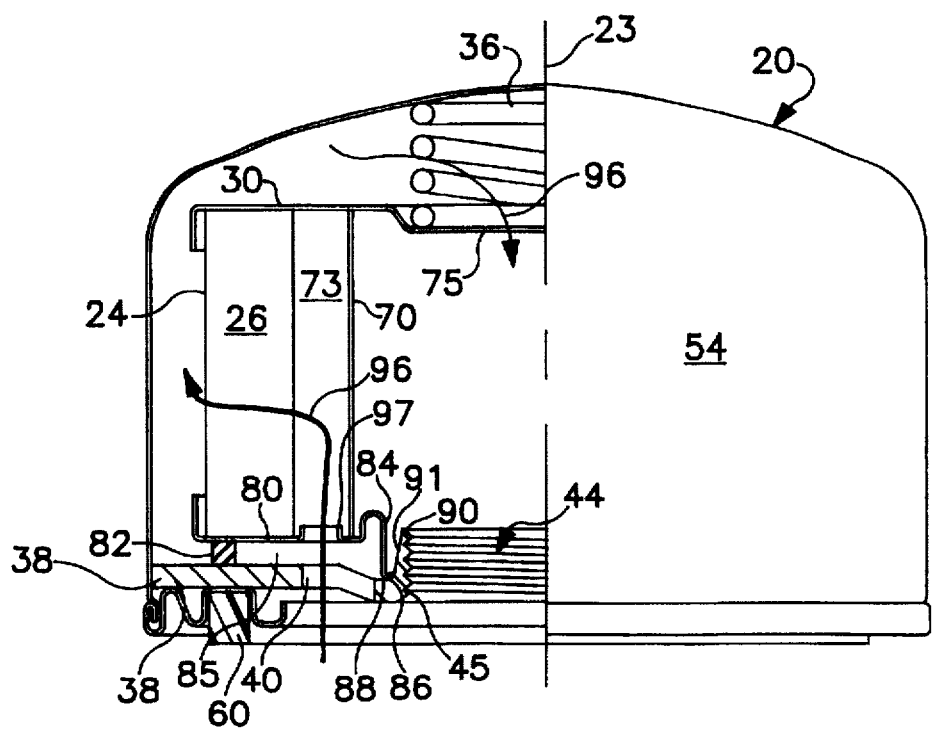
FIG. 3 is a side view, partially in section, of a second embodiment of the invention showing the flow of lubricating oil through the filter cartridge under normal conditions when the filter media therein is not clogged.
Figure 4:
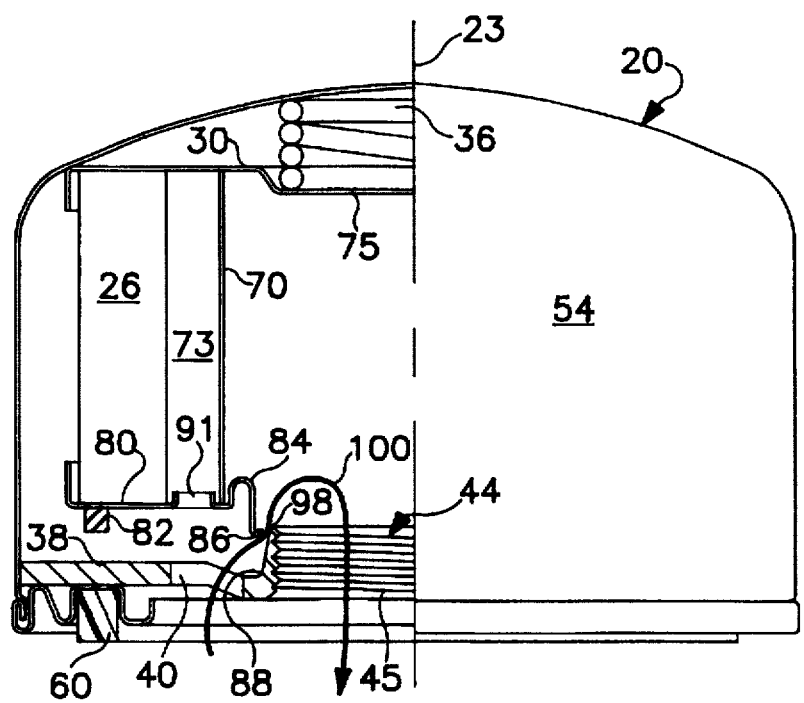
FIG. 4 is a view similar to FIG. 3, but showing a lubricating oil bypassing the filter media when the filter media is clogged.

Referring now to FIGS. 3 and 4, there is shown a second embodiment of the invention which is similar to FIGS. 1 and 2, but differs in that an annular second end cap 80 is employed which includes an outer annular gasket 82 and a unitary inner annular seal 84 defining an annular space 85 therebetween. The inner annular seal 84 includes an arcuate foot 86 which ordinarily nests in a depression 88 at the base of an inwardly tapered neck 90 which provides the threaded bore that defines the central opening 44 in the end plate 38. The tapered neck 90 has a frustoconical exterior wall 91.

The foot 86 and gasket 82 are held in abutment with the end plate 38 by the force of coil spring 36 acting on the first end cap 30. Normally, the unfiltered lubricating oil follows the path of arrows 96 through an inlet 97 between the impervious wall 70 and filter media 26; however, if the filter media 26 becomes clogged, then pressure from the oil entering the radially disposed ports 40 cannot pass the oil through the filter media 26. This causes the filter element 26 to rise from the FIG. 3 position against the bias of coil spring 36 to the FIG. 4 position which creates a gap 98 between the arcuate foot 86 and the sloping exterior wall 91 of the neck 90. Pressurized oil then follows the path of arrow 100 flowing in through the radially spaced ports 40, through the gap 98 and directly out of the center port 44.

Figure 5:
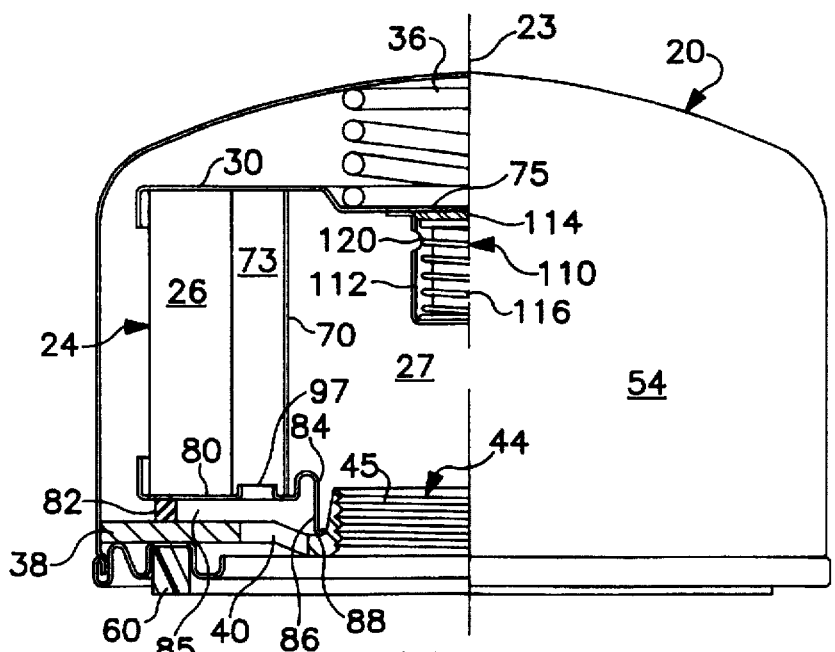
FIG. 5 is a side view, partially in elevation, showing a third embodiment of the invention in which when the engine to which the cartridge is attached is not operating, lubricating oil in the cartridge is not flowing but is retained by an anti-drainback valve.
Figure 6:
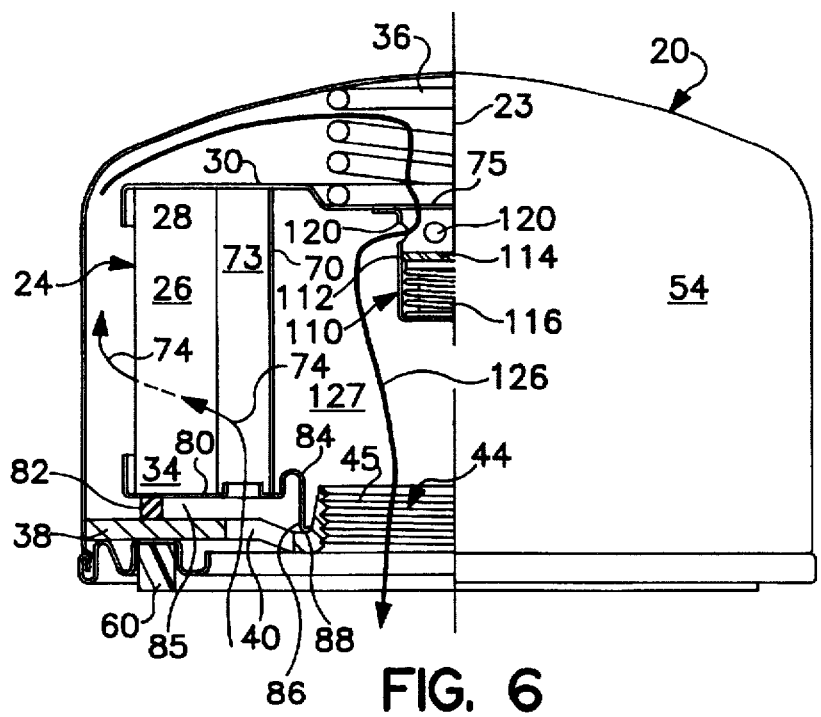
FIG. 6 is a view similar to FIG. 5, but showing lubricating oil flowing through the cartridge.

Referring now to FIGS. 5 and 6, there is shown a fourth embodiment of the invention which is similar in substantially every aspect to the embodiment of FIGS. 3 and 4, but includes an anti-drainback valve assembly 110 disposed in alignment with the opening 75 through the first end cap 30. The anti-drainback valve 110 is mounted in a cylindrical housing 112 and includes a valve member 114 which is biased by a spring 116 to close the opening 75 that leads to the hollow core 27 of the filter assembly 24. By covering the opening 75, the valve member 114 isolates the lubricating oil disposed between the filter media 26 and housing 54 from the central opening 44 by closing the path to outlet ports 120 in the valve housing 112. Consequently, when the engine is not running, and the lubricating oil is not pressurized, the lubricating oil remains within the filter cartridge 20 instead of draining out back to the engine (not shown). Accordingly, when the engine is started, filtered lubricating oil is immediately available.

As is seen in FIG. 6, upon starting the engine, the lubricating oil follows the paths of arrow 126 and applies pressure to the valve member 114 to depress the valve member against the base of spring 116 so as to thereby open communication between the opening 75 and the ports 120 in the valve housing 112. As long as the engine is running, the lubricating oil enters hollow core 27 from ports 120 and exits the filter cartridge 20 through the central opening 44.

Figure 7:
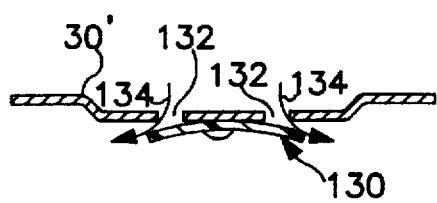
FIG. 7 is a side elevation showing an additional embodiment of an anti-drainback valve.

As is seen in FIG. 7, the anti-drainback valve assembly 110 of FIGS. 5 and 6 is replaced by nylon or polymer flap 130 which is normally self-biased to cover openings 132 through the end plate 30' so that when the oil in the filter housing 54 is not pressurized by an operating engine (not shown), the flap is closed retaining oil in the housing. Upon operating the engine, pressurized oil deflects the flap 130 and flows through the openings 132 in the direction of arrows 134.

In each of the embodiments of this invention, flow reversal is accomplished by substantially altering only the structure of the filter element 24. The remainder of the filter cartridge assembly 20 is substantially unchanged from the prior art filter assemblies. Consequently, a filter cartridge assembly 20 is provided which can be manufactured with minimal disruption of current production line procedures and component replacement.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A filter element adapted for use in a spin-on filter cartridge, wherein the spin-on filter has a central axis and includes a housing having at one end an end plate with a central port and radially positioned ports spaced from the central port as well as a coil spring disposed between the housing and filter element to apply a force to urge the filter element toward the end plate, the filter element comprising:

an annular filter media defining a hollow core and having first and second ends, the annular filter media having a diameter less than that of the housing to define an open space therebetween when the filter media is disposed in the housing;

a first end cap disposed at the first end of the filter media, the first end cap having a central opening therein aligned with the hollow core of the filter media and and having the force of by the coil spring applied therethrough in urging the filter element toward the end plate;

a second end cap disposed at the second end of the filter media, the second end cap having a central opening adapted to fit around the central port and over the radially positioned ports in the end plate;

an imperforate, annular cylindrical wall disposed within the hollow core in radially spaced relation to the filter media to define an annular inlet space therebetween and a central space within the hollow core, wherein said imperforate, annular cylindrical wall extends from the first end of said filter media to the second end of said filter media; and means defining an opening disposed radially between the second end of the filter media and said imperforate, annular cylindrical wall adapted to allow liquid to be filtered to flow from the radially positioned ports into the annular space, the annular space being closed at the first end by the imperforate, annular cylindrical wall and proximate said first end cap wherein, when the liquid is under pressure, the liquid passes only radially outwardly through the filter media into the open space between the filter media and the housing and thereafter flows through the opening in the first end plate into the central space defined by the imperforate, annular cylindrical wall for discharge through the central port.

2. The filter element of claim 1 further including an anti-drainback valve disposed at the opening in the first end cap, the anti-drainback valve adapted to be closed when the liquid in said open space is not pressurized.

3. The filter element of claim 1 further including a bypass valve disposed proximate the second end of the filter media, the bypass valve being adapted to allow liquid to flow radially inward toward the central port in the filter housing when the filter media is clogged.

4. The filter element of claim 3, wherein the bypass valve is configured as an annular seal with an annular foot thereon which is adapted to be disposed about the central opening, the foot being urged against the end plate of the housing by the coil spring which bears against the first end cap of the filter element and urges the filter element toward the end plate, wherein the coil spring exerts a selected force which is overcome when the filter media is clogged, allowing the filter element to be moved against the bias of the spring, axially away from the central port, and allowing the lubricating fluid to flow between the foot of the annular seal and the central port so as to flow from the radial inlet ports directly into the central port.

5. In combination, the housing and filter element of claim 4, wherein the end plate of the housing includes a threaded collar defining the central port, the threaded collar having a frustoconical exterior wall which tapers inwardly, wherein the foot of the valve seats adjacent the frustoconical exterior wall of the collar when the force exerted against the filter element by the pressurized liquid is less than that sufficient to overcome the bias of the spring and wherein, when the filter element is moved axially away from the end plate, a gap occurs between the foot and frustoconical external wall allowing the liquid to flow through the gap and into the central port.

6. The filter element of claim 3 further including an anti-drainback valve at the central opening through the first end cap.

7. The filter element of claim 6, wherein the anti-drainback valve comprises a housing with ports therein, a valve element and a spring for urging the valve element to prevent flow of the pressurized liquid from the first end cap through the ports.

8. The filter element of claim 6, wherein the anti-drainback valve comprises a flap normally biased to close the central opening through the first end cap but opening under pressure when the filter is operating to filter liquid.

9. The filter element of claim 1, wherein the first end cap has an annular indentation therein for seating a coil spring.

10. The filter element of claim 1, wherein the second end cap has a depending inner annular seal extending outwardly therefrom inboard of the impervious hollow wall and defining an opening.

11. The filter element of claim 10, further including an outer annular gasket spaced from the inner annular seal to define an annular space therebetween.

12. The filter element of claim 11, wherein the inner annular seal is unitary with the second end cap and wherein there are apertures through the second end cap aligned with the annular space defined by the impervious wall in the hollow core.

* * * * *